US011761773B2

(12) United States Patent
Rani et al.

(10) Patent No.: US 11,761,773 B2
(45) Date of Patent: Sep. 19, 2023

(54) METHOD AND SYSTEM FOR PATH RECONSTRUCTION OF PERIODICALLY SAMPLED GEOGRAPHICAL POSITION DATA

(71) Applicant: AZUGA, Inc., San Jose, CA (US)

(72) Inventors: Ananth Rani, Fremont, CA (US); Ashwin Sabapathy, Bangalore (IN)

(73) Assignee: Azuga, Inc., San Jose, CA (US)

( * ) Notice: Subject to any disclaimer, the term of this patent is extended or adjusted under 35 U.S.C. 154(b) by 101 days.

(21) Appl. No.: 17/151,379

(22) Filed: Jan. 18, 2021

(65) Prior Publication Data

US 2022/0228876 A1 Jul. 21, 2022

(51) Int. Cl.
*G01C 21/34* (2006.01)
*G01C 21/36* (2006.01)
*G01S 19/42* (2010.01)

(52) U.S. Cl.
CPC ..... *G01C 21/3446* (2013.01); *G01C 21/3626* (2013.01); *G01S 19/42* (2013.01)

(58) Field of Classification Search
CPC .. G01C 21/3446; G01C 21/3626; G01S 19/42
See application file for complete search history.

(56) References Cited

U.S. PATENT DOCUMENTS 8,718,932 B1 5/2014 Pack et al.
9,939,276 B2 4/2018 Cui et al.

10,024,673 B1 * 7/2018 Zhang ................ G01C 21/3446
10,323,948 B2 * 6/2019 Kitchel ............... G06F 16/2365
2019/0390972 A1 * 12/2019 Jiao ...................... G01C 21/367

FOREIGN PATENT DOCUMENTS

WO WO-2014143058 A1 * 9/2014 ............. G01C 21/30

OTHER PUBLICATIONS

International Search Report & Written Opinion dated Apr. 25, 2022 for Application No. PCT/US2022/070060, 15 pages.

* cited by examiner

*Primary Examiner* — Anshul Sood
*Assistant Examiner* — Matthew Ho (57) ABSTRACT

A computer implemented method for reconstructing a path taken by a vehicle using periodically sampled geographical position data is disclosed comprising accessing telemetric data including a plurality of GPS points; ordering the plurality of GPS points sequentially, where in a first GPS point is a starting point; identifying a next GPS point in the sequence; generating an area around the identified next GPS point; determining all street segments located within the area; calculating a distance from the starting point to each of the street segments located within the area; storing the street segments that are the shortest distance from the starting point; setting the endpoints of the stored street segments as the starting points; repeat these until a final GPS point is processed; and determining the shortest path by joining the shortest path from each point starting at the starting point and ending at the final GPS point.

14 Claims, 4 Drawing Sheets

METHOD AND SYSTEM FOR PATH RECONSTRUCTION OF PERIODICALLY SAMPLED GEOGRAPHICAL POSITION DATA

BACKGROUND OF THE INVENTION

Field of the Invention

Embodiments of the present invention generally relate to path reconstruction, and more specifically to a method for reconstructing a path taken by a vehicle using periodically sampled geographical position data.

Description of the Related Art

Representing a path taken by an object, such as a vehicle has a number of commercial applications, such as fleet tracking, where path reconstruction of the fleet vehicles is essential for operational requirements. Vehicles equipped with global positioning system (GPS) telematics devices that capture latitude, longitude, altitude, speed, heading, and the like, typically log data at periodic time intervals (e.g., every two minutes) or distance intervals (e.g., every 200 meters). These logged data points may be used to reconstruct the path taken by the vehicle such that the path can be overlaid on a map to determine the turn-by-turn path a vehicle traveled.

The mapping service layer of applications such as Google Maps™, HERE Maps®, Opens Street Maps, and the like, is used to interpolate a most likely path taken between two consecutive points. GPS data obtained from commercial sensors depend on the visibility of navigation satellites and are typical accurate within three to ten meters under open skies. The accuracy of GPS decreases for reasons such as low relative altitude of satellites or reflections of signals off buildings, trees, and cloud cover. The lower level of accuracy causes location points to 'drift' to different lanes, sometimes into oncoming traffic and sometimes to adjacent road stretches near intersections. This 'drift' causes the mapping service layer to reconstruct the path taken by the vehicle has having looped around when one of three consecutively sampled location points has drifted to a lane with oncoming traffic. Such loops are also created when the location point has drifted to an adjacent lane. The loop is manifested when such points are requested to be joined together using external direction finding services such as Google® Maps.

Increasing the sampling interval does not alleviate the problem of looping, but rather aggravates it by increasing the number of locations points with 'drift'. Similarly, snapping the location points to a road does not address this issue since the location points are often snapped to the wrong road, thereby increasing looping.

Therefore, there is a need for a method for reconstructing a path taken by a vehicle using periodically sampled geographical position data without such loops.

SUMMARY OF THE INVENTION

A system and/or method is provided for reconstructing a path taken by a vehicle using periodically sampled geographical position data substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

While the method and system for reconstructing a path taken by a vehicle using periodically sampled geographical position data is described herein by way of example for several embodiments and illustrative drawings, those skilled in the art will recognize that the method and system for reconstructing a path taken by a vehicle using periodically sampled geographical position data is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for reconstructing a path taken by a vehicle using periodically sampled geographical position data defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed fora system and method for reconstructing a path taken by a vehicle using periodically sampled geographical position data, according to embodiments of the invention. A telemetric system in a vehicle captures geographic position data as a set of points that indicate latitude, longitude, altitude, heading, and the like, of the vehicle, each point having a timestamp. The set of points may be global positioning system (GPS) coordinates, herein referred to as GPS points. In some embodiments, the set of GPS points are assumed to be accurate to within 20-40 meters; however, in some embodiments, the assumed accuracy may be a configurable distance. The set of GPS points are sequenced in chronological order. The first location, the starting point, may be a known location, for example, a truck depot and may be used as a point. The second GPS point in the sequence is identified. An area, for example a circle having for example a 30 m radius, is generated around the GPS point and is herein referred to as a GPS area or GPS circle. All street segments within the GPS circle are determined. A shortest path algorithm is run between the starting point and the street segments located within the GPS circle generated around the second GPS point. The two street segments that create the shortest path from the starting point are saved. The endpoints of the two saved street segments are the new starting points for the next step. The process repeats, determining the shortest path from endpoints of the saved street segments to the GPS circle around the next GPS point in the sequence until the end point is reached. When the shortest path from the driver's starting position to the driver's ending position is found, a path is determined that runs through all the GPS circles that were generated from the GPS points. The path includes no looping and represents an accurate path of the vehicle. As a final step, each of the GPS circles is snapped to a closest point of the shortest path. These cleaned up GPS points are input to a mapping layer in order to draw a turn-by-turn, segment-by-segment, loop-free path on a map.

Various embodiments of a method and system for reconstructing a path taken by a vehicle using periodically sampled geographical position data are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Although the present disclosure is described in terms of reconstructing a path of a vehicle, the present disclosure may be used to reconstruct the path of any moving object that collects telemetric data that includes periodically sampled geographical position data.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
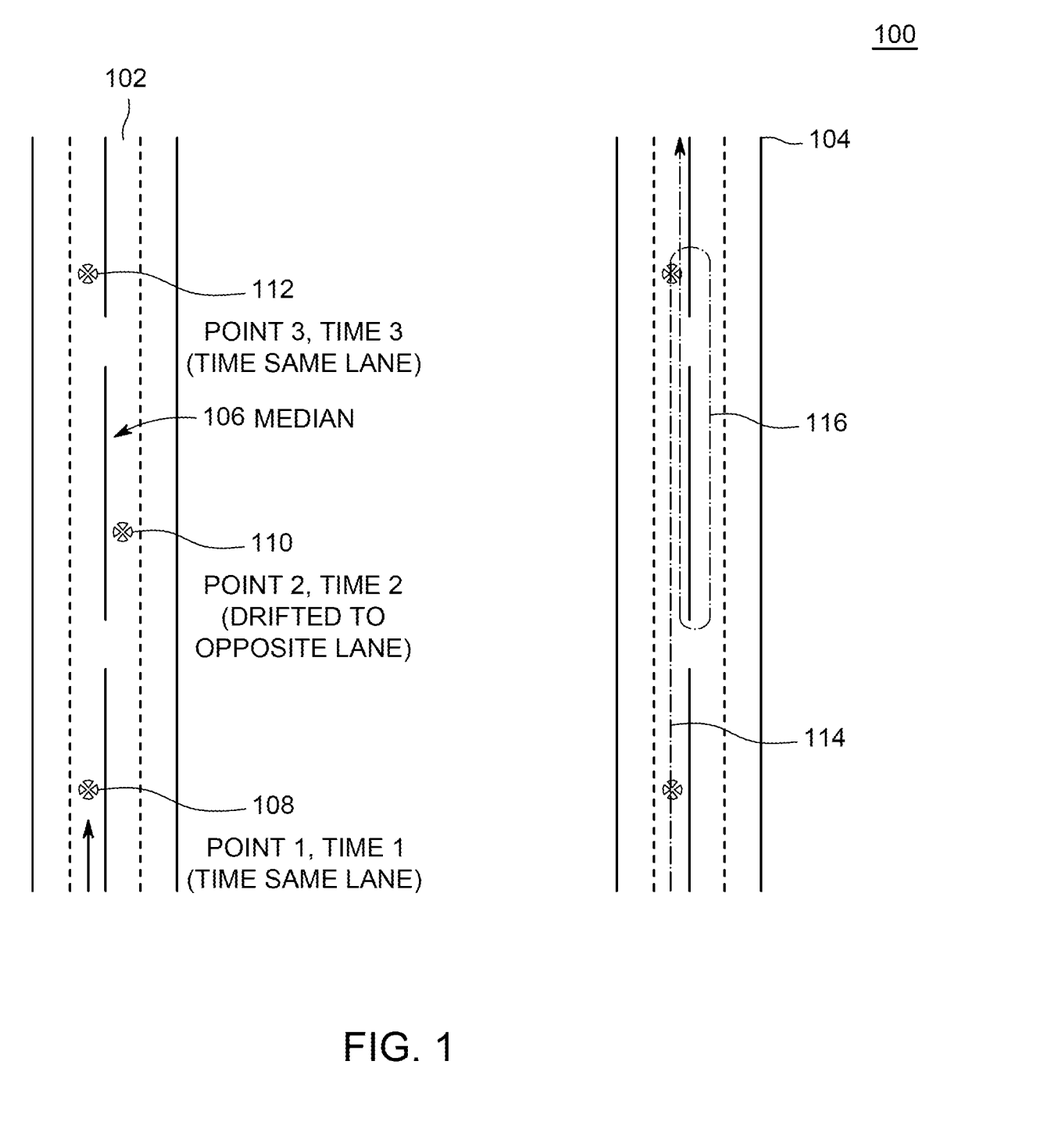
FIG. 1 illustrates the looping problem presented by the prior art, which is solved by the present invention.

FIG. 1 illustrates the problem 100 of the prior art, which is solved by the present invention. Due to the low relative altitude of satellites or reflection of signals off buildings, trees, and cloud cover, the accuracy of GPS data decreases. The decreased accuracy causes GPS points to 'drift' to different lanes and sometimes to adjacent roads near intersections. A vehicle with a telematic system has traveled on road 102 with median 106. The GPS point 108 is at time 1 and shows the vehicle in a lane left of the median 106. The second GPS point 110 is taken at time 2. The GPS point 110 shows the vehicle across the median 106. In other words, the GPS point 110 has drifted into across the median 106 into what would be oncoming traffic. The GPS point 112 at time 3 shows the vehicle in the same lane as GPS point 108. In order to reconstruct the path 114, and to keep the vehicle moving in the same direction as the traffic, the 'drift' of GPS point 110 causes the mapping layer to reconstruct the path 114 taken by the vehicle as having a loop 116.

Figure 2:
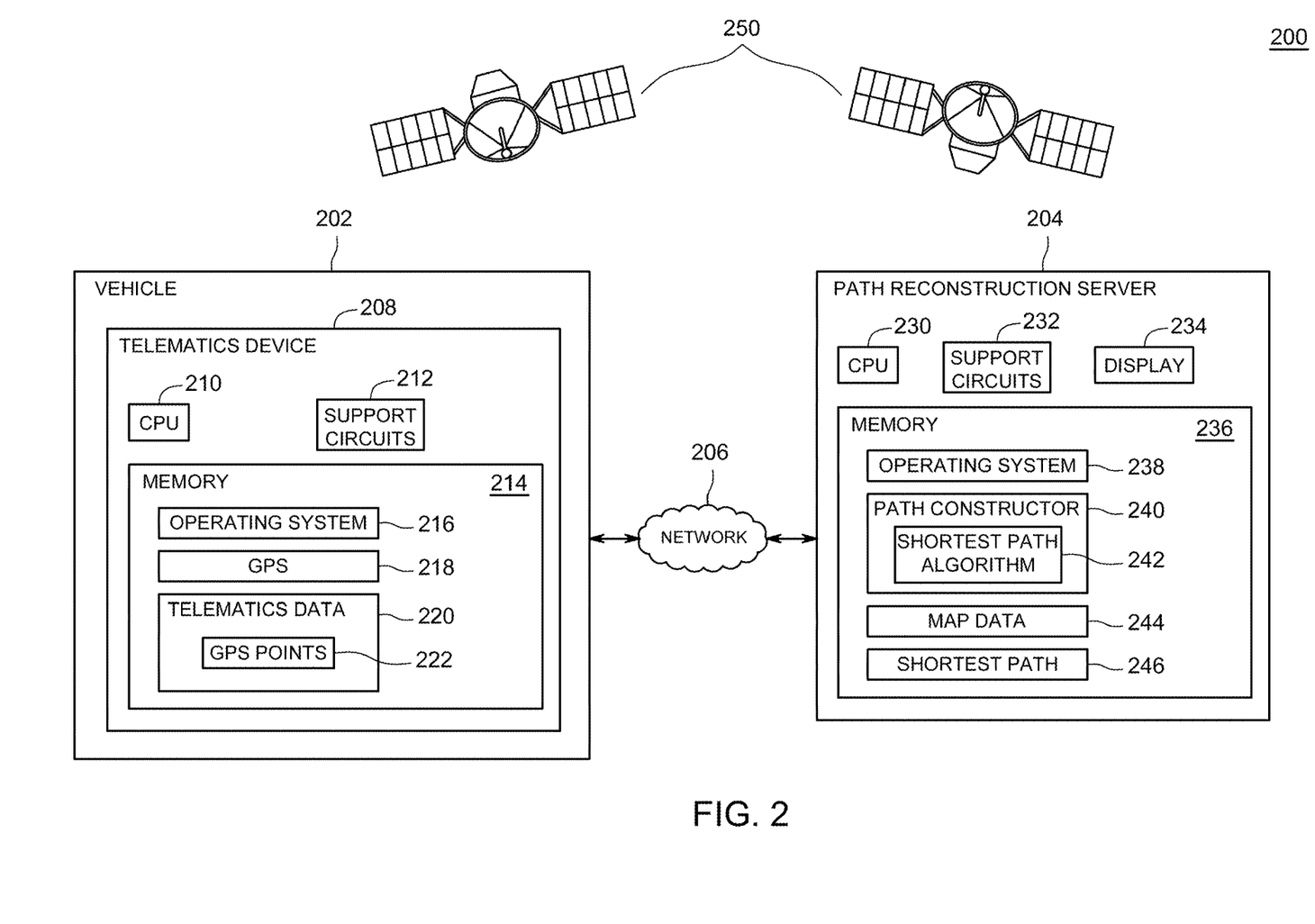
FIG. 2 depicts a block diagram of a system for reconstructing a path taken by a vehicle using periodically sampled geographical position data, according to one or more embodiments of the invention.

FIG. 2 depicts a block diagram of a system 200 for reconstructing a path taken by a vehicle using periodically sampled geographical position data, according to one or more embodiments of the invention. The system 200 includes a vehicle 202 and a path reconstruction server 204, communicatively coupled via network 206. The system also includes a plurality of satellites 250. The vehicle 202 includes a telematics device 208. The telematics device 208 is in communication with and receives location coordinates from the GPS satellites 250

The telematics device 208 includes a Central Processing Unit (CPU) 210, support circuits 212, and a memory 214. The CPU 210 may include one or more commercially available microprocessors or microcontrollers that facilitate data processing and storage. The various support circuits 212 facilitate the operation of the CPU 210 and include one or more clock circuits, power supplies, cache, input/output circuits, and the like. The memory 214 includes at least one of Read Only Memory (ROM), Random Access Memory (RAM), disk drive storage, optical storage, removable storage and/or the like. The memory 214 includes an operating system 216, a GPS system 218, and telematics data 220. The telematics data 220 includes a set of GPS points 222. The operating system 216 may include various commercially known operating systems.

The path reconstruction server 204, may be in the cloud. Examples of the path reconstruction server 204, include, but are not limited to a blade server, virtual machine, and the like. The path reconstruction server 204 includes a Central Processing Unit (CPU) 230, support circuits 232, a display 234, and a memory 236. The CPU 230 may include one or more commercially available microprocessors or microcontrollers that facilitate data processing and storage. The various support circuits 232 facilitate the operation of the CPU 230 and include one or more clock circuits, power supplies, cache, input/output circuits, and the like. The memory 236 includes at least one of Read Only Memory (ROM), Random Access Memory (RAM), disk drive storage, optical storage, removable storage and/or the like. The memory 236 includes an operating system 238. The operating system 238 may include various commercially known operating systems. The memory 236 also includes a path constructor 240, map data 244, and a saved shortest path 246. In some embodiment, the path reconstruction functionality (i.e., the path reconstructor 240, map data 244, and shortest path 246) is located on the telematics device 208.

The network 206 includes a communication system that connects computers (or devices) by wire, cable, fiber optic and/or wireless link facilitated by various types of well-known network elements, such as hubs, switches, routers, and the like. The network 206 may be a part of the Intranet using various communications infrastructure, such as Ethernet, Wi-Fi, a personal area network (PAN), a wireless PAN, Bluetooth, Near field communication, and the like.

The GPS 218 in the telematic device 208 captures telematics data 220 from satellites 250. The plurality of satellites 250 are constantly transmitting information to the GPS 218. Each transmission from each satellite 250 includes the location of the satellite 250 and the time the signal was sent from the satellite 250. The GPS 218 calculates latitude, longitude, altitude, speed, and heading based on the information received from the satellites 250. The telematic device 208 stores telematics data 220 that includes latitude, longitude, altitude, speed, and heading of the vehicle. Due to the sheer volume of information received by the GPS 218, the telematics device 208 logs the information at periodic time intervals (e.g., every two minutes) or distance intervals (e.g., every 200 meters). This periodically logged data is stored as GPS points 222. The telematics data 220 also includes a timestamp for each GPS point 222. In some embodiments, the telematics data 220 is transmitted to the path reconstruction server 204 as it is logged. In some embodiments, the telematics data 220 is transmitted to the path reconstruction server 204 after the vehicle reaches its destination. The telematics data 220 is transmitted to the path reconstruction server 204 over network 206. In some embodiments, where the path reconstruction functionality is performed on the telematic device 208, the path constructor 240 simply accesses the telematics data 220. Advantageously, in embodiments where the path reconstruction takes place on the telematic device 208, path reconstruction may be performed more frequently (i.e., no waiting until the vehicle reaches its destination) and less expensively by leveraging the computing power of the telematics device 208.

In some embodiments, the path constructor 240 may assume the received GPS points 22 are accurate to within a certain distance, for example 30 meters; however, in some embodiments, the assumed accuracy may be a configurable distance. The plurality of GPS points 222 is sequenced in chronological order. The first GPS point 222 may be a known location, for example, a truck depot and may be used as a starting point. The second GPS point 222 in the sequence is identified. The path constructor 240 generates a circle with a radius of, for example, 30 m around the GPS point 222 to create a GPS circle. The path constructor 240 uses map data 244 to determine all street segments that are within the GPS circle generated around the second GPS point 222.

The shortest path algorithm 242 is run between the starting point and all of the street segments located within the GPS circle around the second GPS point 222. The two street segments that create the shortest path from the starting point are saved. The endpoints of the two saved street segments are used as the new starting points for the next step. The third GPS point 222 in the sequence is identified and the steps are repeated using the two new starting points. The path constructor 240 generates a GPS circle around the third GPS point 222 and identifies all street segments within the GPS circle. The shortest path algorithm 242 is executed between the endpoints of the two saved street segments from the previous GPS point (the second GPS point) and the street segments within the circle around the third GPS point 222. The two shortest paths between the second GPS point 222 and the third GPS point 222 are saved. These steps are repeated for all GPS points 222 in sequential order until the last GPS point 222 (i.e., the destination point) is processed.

After the last GPS point 222 is processed, a shortest path 246 from the driver's starting position to the driver's ending position is identified. The shortest path 246 runs through all the GPS circles that were generated from the GPS points 222. The path includes no looping and represents an accurate path taken by the vehicle.

Finally, the path constructor 240 snaps each of the GPS circles to a closest GPS point of the shortest path 246. These GPS points are input to a mapping layer in order to draw a turn-by-turn loop free path on a map.

Figure 3:
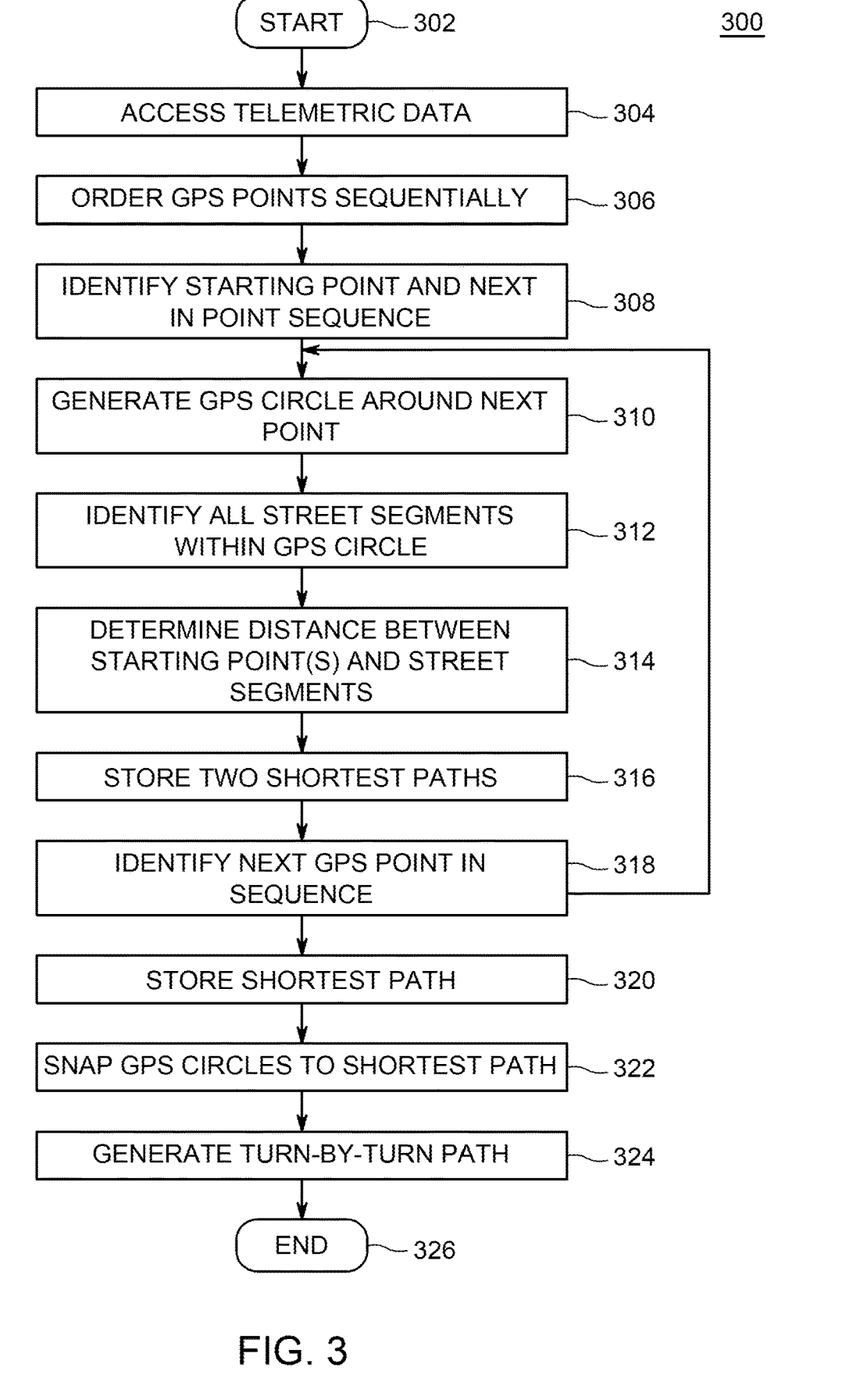
FIG. 3 depicts a flow diagram of a method reconstructing a path taken by a vehicle using periodically sampled geographical position data, according to one or more embodiments of the invention.

FIG. 3 depicts a flow diagram of a method 300 for reconstructing a path taken by a vehicle using periodically sampled geographical position data, according to one or more embodiments of the invention. In some embodiments, the method 300 is performed on telematics device in a vehicle. In some embodiments, the method 300 is performed on a path reconstruction server that is remote from the telematics device. The method 300 starts at step 302 and proceeds to step 304.

At step 304, telemetric data is received. The telemetric data includes a plurality of GPS points that were acquired during a trip by a vehicle. Each GPS point includes a longitude, latitude, altitude, heading, and a timestamp. The GPS points were sampled at periodic time intervals (e.g., every two minutes) or distance intervals (e.g., every 200 meters).

At step 306, the GPS points are ordered sequentially starting with the GPS point earliest in time and sequenced chronologically to the GPS point latest in time.

At step 308, the first GPS point and the second GPS in the sequence are identified. The first GPS point is stored and is set as the starting point. The second GPS is set as the current GPS point.

At step 310, a GPS circle is generated around the current GPS point. The radius of the circle is based on how accurate the GPS point is assumed to be. For example, if GPS points are assumed to provide an accurate location within 30 meters, the circle generated around the current GPS point is 30 m. The assumed accuracy may be a pre-configured value.

At step 312, all street segments with the generated GPS circle are identified. Map data is used to identify every street that runs through the GPS circle. For example, if the map data is loaded into PostGreSQL with the postGIS extensions enabled, a simple query returns all of the street segments that lie within 30 m of a GPS position.

At step 314, a shortest path algorithm is used to determine the distance from the starting point to each street segment in the generated GPS circle.

At step 316, the two shortest paths are stored. The two street segments that created the shortest paths are stored. The two endpoints of the street segments that formed the shortest paths are used as the starting positions for determining the shortest path to the next GPS point in the sequence.

At step 318, the next GPS point in the sequence is identified. The method 300 proceeds to step 310 and repeats identifying the two shortest paths from the starting point(s) of the previous GPS point to the street segments in the GPS circle around the next point. When at step 318, the last GPS point (the stopping point) is processed, then at step 320, the shortest path between the starting point and stopping point is stored.

At step 322, all the generated GPS circles are snapped to the closest point on the shortest path.

At step 324, the GPS points are used as input to the mapping layer and a turn-by-turn loop free path on a map is generated. The method ends at step 326.

Figure 4:
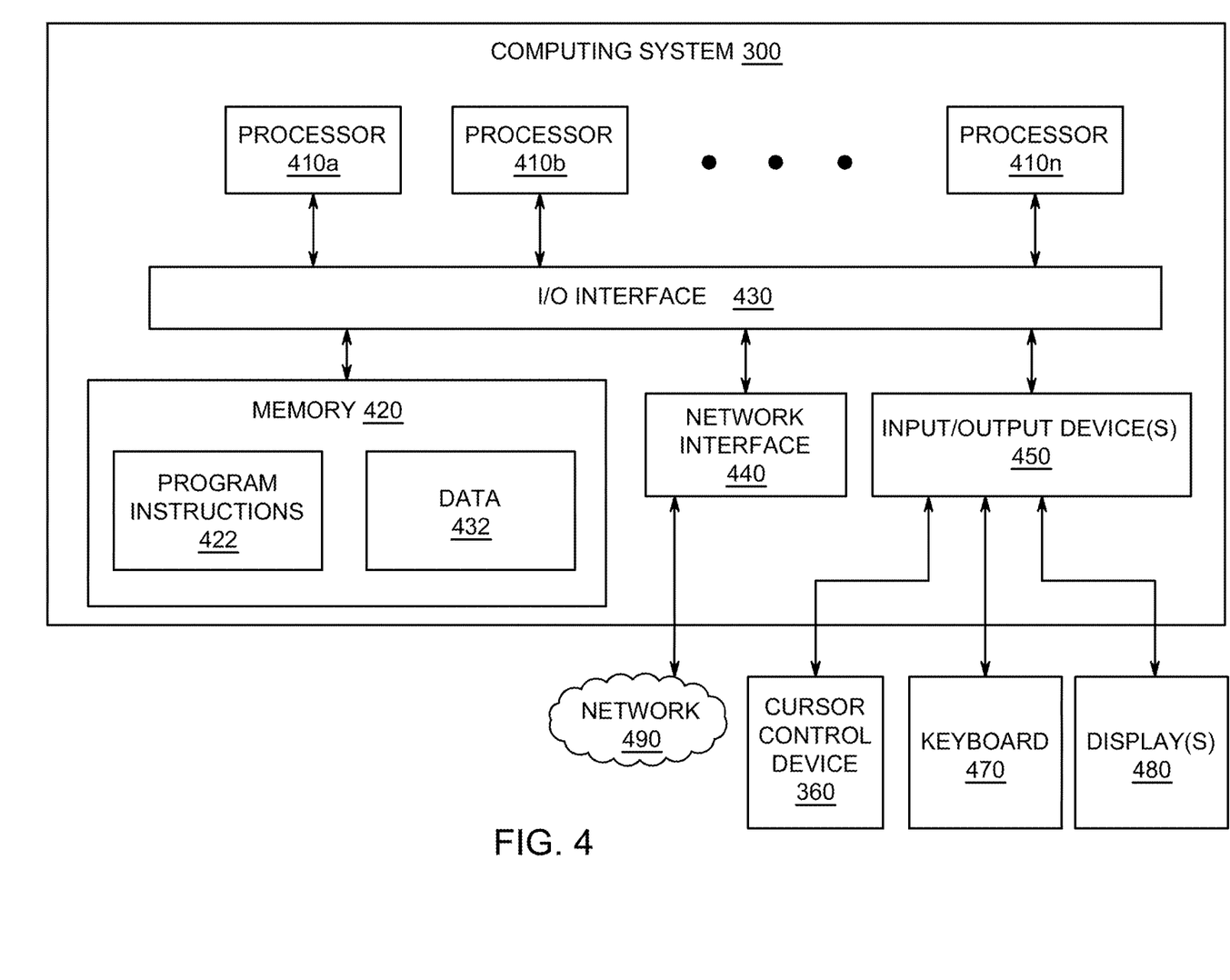
FIG. 4 depicts a computer system that can be utilized in various embodiments of the present invention to implement the computer and/or the display, according to one or more embodiments of the invention.

FIG. 4 depicts a computer system that can be used to implement the method of FIG. 3 in various embodiments of the present invention. Various embodiments of method and system for reconstructing a path taken by a vehicle using periodically sampled geographical position data, as described herein, may be executed on one or more computer systems, which may interact with various other devices. One such computer system is computer system 400 illustrated by FIG. 4, which may in various embodiments implement any of the elements or functionality illustrated in FIGS. 2-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, persistent storage (magnetic or solid state), or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the system, including network interface 440 or other peripheral interfaces, such as input/output devices 450, In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the method illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for reconstructing a path taken by a vehicle using periodically sampled geographical position data, comprising:
   (i) accessing on a telematics device, telemetric data from a location identification system for a trip traveled by a vehicle, wherein the telemetric data includes a plurality of global positioning system (GPS) points, each point comprising an associated timestamp;
   (ii) ordering the plurality of GPS points sequentially, wherein a first GPS point in the sequence is a starting point for the vehicle;
   (iii) identifying a next GPS point in the sequence;
   (iv) generating a GPS area around the identified next GPS point;
   (v) determining street segments located within the GPS area;
   (vi) calculating a distance from the starting point to each of the street segments located within the GPS area;
   (vii) storing two street segments that provide the shortest distance from the starting point;
   (viii) setting endpoints of the stored two street segments as the next starting points;
   repeating steps (iii)— (viii) until a final GPS point in the sequence is processed;
   determining a shortest path between the first GPS point and the final GPS point extending through each generated GPS area and through the shortest of the stored two street segments;
   snapping each of the generated GPS areas to a closest GPS point on the shortest path; and
   drawing a turn-by-turn, loop-free path on a digital map displayed on a digital display using the GPS points associated with the snapped GPS areas.

2. The method of claim 1, wherein the telemetric data comprises longitude, latitude, altitude, and heading for each GPS point.

3. The method of claim 1, wherein a radius of the GPS area is determined based on an assumed accuracy of the plurality of the GPS points.

4. The method of claim 3, wherein the radius is a configurable distance.

5. The method of claim 1, wherein a shortest path algorithm is used to determine the distance from each starting point to each street segment in the generated GPS areas.

6. A system for reconstructing a path taken by a vehicle using periodically sampled geographical position data, comprising:
   a) at least one processor;
   b) at least one input device; and
   c) at least one storage device storing processor-executable instructions which, when executed by the at least one processor, perform a method including:
      (i) accessing on a telematics device, telemetric data from a location identification system for a trip traveled by a vehicle, wherein the telemetric data includes a plurality of global positioning system (GPS) points, each point comprising an associated timestamp;
      (ii) ordering the plurality of GPS points sequentially, wherein a first GPS point in the sequence is a starting point for the vehicle;

(iii) identifying a next GPS point in the sequence;
(iv) generating a GPS area around the identified next GPS point;
(v) determining all street segments located within the GPS area;
(vi) calculating a distance from the starting point to each of the street segments located within the GPS area;
(vii) storing two street segments that provide the shortest distance from the starting point;
(viii) setting endpoints of the stored two street segments as the next starting points;
repeating steps (iii)-(viii) until a final GPS point in the sequence is processed;
determining a shortest path between the first GPS point and the final GPS point extending through each generated GPS area and through the shortest of the stored two street segments;
snapping each of the generated GPS areas to a closest GPS point on the shortest path; and
drawing a turn-by-turn, loop-free path on a digital map displayed on a digital display using the GPS points associated with the snapped GPS areas.

7. The system of claim 6, wherein the telemetric data comprises longitude, latitude, altitude, and heading for each GPS point.

8. The system of claim 6, wherein a radius of the GPS area is determined based on an assumed accuracy of the plurality of the GPS points.

9. The system of claim 8, wherein the radius is a configurable distance.

10. The system of claim 6, wherein a shortest path algorithm is used to determine the distance from each starting point to each street segment in the generated GPS area.

11. A non-transitory computer readable medium for storing computer instructions that, when executed by at least one processor causes the at least one processor to perform a method for reconstructing a path taken by a vehicle using periodically sampled geographical position data, comprising:

accessing, on a telematics device, telemetric data from a location identification system for a trip traveled by a vehicle, wherein the telemetric data includes a plurality of global positioning system (GPS) points, each point comprising an associated timestamp;
(ii) ordering the plurality of GPS points sequentially, wherein a first GPS point in the sequence is a starting point for the vehicle;
(iii) identifying a next GPS point in the sequence;
(iv) generating a GPS area around the identified next GPS point;
(v) determining all street segments located within the GPS area;
(vi) calculating a distance from the starting point to each of the street segments located within the GPS area;
(vii) storing two street segments that provide the shortest distance from the starting point;
(viii) setting endpoints of the stored two street segments as the next starting points;
repeating steps (iii)-(viii) until a final GPS point in the sequence is processed;
determining a shortest path between the first GPS point and the final GPS point extending through each generated GPS area and through the shortest of the stored two street segments;
snapping each of the generated GPS areas to a closest GPS point on the shortest path; and
drawing a turn-by-turn, loop-free path on a digital map displayed on a digital display using the GPS points associated with the snapped GPS areas.

12. The non-transitory computer readable medium of claim 11, wherein the telemetric data comprises longitude, latitude, altitude, and heading for each GPS point.

13. The non-transitory computer readable medium of claim 11, wherein a radius of the GPS area is determined based on an assumed accuracy of the plurality of the GPS points.

14. The non-transitory computer readable medium of claim 11, wherein a shortest path algorithm is used to determine the distance from each starting point to each street segment in the generated GPS area.

* * * * *